Patented Dec. 18, 1934

1,984,714

UNITED STATES PATENT OFFICE 1,984,714

SULPHO-ALKYL ESTERS OF ABIETIC ACIDS AND PROCESS OF PREPARING THE SAME

Henry J. Weiland and Clyde O. Henke, South Milwaukee, and Milton A. Prahl, Milwaukee, Wis., assignors to E. I. du Pont de Nemours & Company, Wilmington, Del., a corporation of Delaware No Drawing. Application December 21, 1932, Serial No. 648,240

15 Claims. (Cl. 260—99.40)

This invention relates to novel compositions of matter. It is an object of this invention to produce novel compositions of matter which are characterized by extremely high wetting powers and are therefore useful as wetting and penetrating agents. It is a further object of this invention to provide a convenient and economical process for producing such novel compositions.

Other and further important objects of this invention will appear as the description proceeds.

Our novel compositions of matter are characterized by containing as the active constituent a compound which may be considered as the mono-abietic acid ester of an hydroxy-alkyl-sulphonic acid or its water-soluble salts. Our novel compounds, which form an integral part of this invention, possess a chemical structure corresponding to the formula:

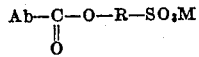

wherein Ab stands for the hydrocarbon radical of the abietic acid structure, that is, for the radical $C_{19}H_{29}$ in the case of abietic acid and for the radical $C_{19}H_{31}$ or $C_{19}H_{33}$ in the case of hydrogenated abietic acid, R stands for the hydrocarbon residue of a short chain alcohol-sulphonic acid, while M stands for hydrogen or a metallic atom or radical such as Na, K, or $NH_4$.

These novel compounds may be synthesized by reacting an abietic acid containing material, such as wood or gum rosin, abietic acid, or hydrogenated abietic acid, or an alkali-metal or ammonium salt of these, with a halogen-alkyl-sulphonic acid, such as chloro-ethane-sulphonic acid, bromopropane-sulphonic acid and the like, or a salt thereof in an alkaline medium. This reaction may be illustrated by the following equation:

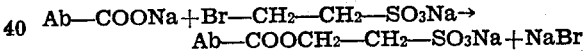

An optional method of preparation is to react abietoyl chloride or hydroabietoyl chloride, as the case may be, with an alkali metal salt of an alcohol-sulphonic acid, such as hydroxy-ethane-sodium-sulphonate, the reaction in this case being represented by the equation:

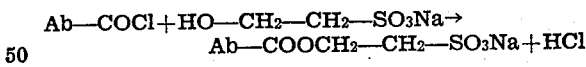

A third method consists of reacting a resin acid, such as abietic acid or hydroabietic acid, with an alcohol sulphonic acid or a salt thereof, in the presence of anhydrous hydrochloric acid or sulphuric acid as condensing agent.

All three methods above may be considered as specific modifications of a general process involving the reaction of an abietic acid compound containing an exchangeable atom or radical on the carbonyl group with an aliphatic- or cyclo-aliphatic-sulphonic acid compound containing a supplementary exchangeable atom or group attached to a carbon atom, the term supplementary as used above implying a capacity to react with the first mentioned exchangeable atom or group to split off an inorganic salt, acid or water. This general process is opposed to the process, for instance, of first condensing abietic acid with an alcohol derivative and then sulphonating; and is improved thereover, because it assures a definite position for the sulphonic acid group, and further assures that the final product is truly a sulphonic acid, and not a sulphate.

We have found that compounds of the above general formula are characterized by extremely high wetting and penetrating powers, which are particularly noticeable at high dilutions. Thus, when used in a concentration of 1 part in 1000, the wetting power of our novel esters when measured inversely by the sinking time required for a standard piece of yarn according to Draves' and Clarkson's method (Am. Dyestuff Reptr., 20, 201–7) is 2 to 4 times as great as that of isopropyl-naphthalene-sodium-sulphonate. They also have valuable emulsifying and foaming properties.

Since high-power wetting agents, capable of acting at extreme dilution, are in great demand in many technical fields, our novel compounds constitute an extremely valuable contribution to the arts where wet treatment of materials is employed. Such arts include the washing, cleansing, dyeing or bleaching of textile fibers, both of vegetable and animal origin; the liquid treatment of hides, leather, furs, including such operations as tanning, cleansing or dyeing; washing or spraying of fruits, seeds, or nuts; and so forth.

Our novel compounds are not to be confused with the compounds obtained by "sulphonating", so to speak, glycol or glycerine esters of colophony. The latter compounds are, strictly speaking, sulphuric acid esters, and not sulphonic acids. Moreover, these sulfuric acid esters possess but very poor wetting powers, and their technical value is mostly as detergents or soaps. Our novel esters, on the contrary, are not particularly qualified as soaps except in highly concentrated alkaline medium. They are, however, powerful wetting agents, exceeding in this respect all hitherto known agents, especially at high dilutions.

Without limiting our invention to any particular procedure, the following examples are given for the purpose of illustrating the same. Parts given are parts by weight.

*Example 1*

100 parts of gum rosin (grade N) are dissolved in 266 parts of alcohol (95%) and to this solution are added 14 parts of caustic soda dissolved in 66 parts of water. The mass is stirred well, 70 parts of sodium-bromo-ethane-sulphonate are added, and the whole is heated in an autoclave at about 110° C. for 15 hours. After cooling, the pressure is released and the reaction mixture is filtered to remove the salt of formation (NaBr). The filtrate is evaporated to dryness, preferably under vacuum, and the residue is extracted with benzene. After filtration, the benzene extract is evaporated to dryness. If desired, the product may be further purified by dissolving in hot water, filtering off any suspended impurities, and evaporating to dryness.

The product thus obtained is a grayish white solid, soluble in hot water to about 10% by weight, and also soluble in alcohol and in benzene. It possesses extremely high wetting powers and resembles in general the normal mono-abietic acid ester of propane-diol-3-sodium sulphonate described in copending application Ser. No. 621,514, by Weiland, Henke and Etzel.

The reaction product is most probably the sodium salt of beta-sulfo-ethyl-abietate, corresponding to the formula:

$$C_{19}H_{29}-CO-O-CH_2-CH_2-SO_3Na$$

*Example 2*

The procedure is the same as in Example 1, except in lieu of gum rosin 100 parts of abietic acid are used, as obtained for instance by the process of U. S. Patent No. 1,846,639. The product is substantially identical with that obtained in Example 1.

*Example 3*

The procedure is the same as in Example 1, except that in lieu of gum rosin 100 parts of vacuum distilled hydrogenated rosin (prepared according to copending application of C. O. Henke, Ser. No. 486,748) is used.

The product resembles in properties that obtained in Example 1, and is most probably the sodium salt of beta-sulpho-ethyl-hydroabietate.

*Example 4*

15 parts of sodium-ethanol-sulphonate are mixed with 32 parts of hydro-abietoyl chloride (as obtained for instance according to copending application of Henke and Prahl, Ser. No. 648,241; this process consists of reacting with thionyl chloride or phosphorus pentachloride upon hydrogenated rosin in an anhydrous organic liquid and recovering the reaction product), and the mass is heated, with stirring, at about 125° C. for a period of 8 hours. It is then allowed to cool somewhat, and 150 parts of hot water are added to dissolve the mass, alcohol being added, if desired, to aid solution. The mixture is then neutralized with sodium carbonate solution, about 2 parts of sodium carbonate (anhydrous) being required. It is then evaporated under vacuum at 100° to dryness and pulverized.

The product is substantially identical with that obtained in Example 3. It may be further purified, if desired, by extracting with alcohol or benzene, followed by filtration and evaporation. This process, however, is not essential, since the crude product dissolves in water substantially without turbidity, and possesses extremely high wetting efficiency.

*Example 5*

The procedure is the same as in Example 4, except that in lieu of 15 parts of sodium-ethanol-sulphonate 18 parts of sodium-propanol-sulphonate are used. The latter compound may be prepared by reacting propylene chlorhydrin with sodium sulphite in aqueous solution, evaporating to dryness and extracting the desired product with alcohol.

The product obtained in this example resembles very much the product obtained in Example 3. It is most probably the sodium salt of sulpho-propyl-hydro-abietate.

In a similar manner the esters corresponding to sodium-butanol-sulphonate, sodium-pentanol-sulphonate, or sodium-cyclo-hexanol-sulphonate may be prepared. These intermediates in turn may be prepared by reacting with sulphur trioxide upon the respective alcohol, and hydrolyzing the product in water. The sulphonic acid group by this method generally enters the position adjacent to the OH group, and the resultant esters do not possess such high wetting powers, as for instance, the products of Examples 1 or 3.

It will be understood that many variations and modifications are possible in our preferred procedure without departing from the spirit of this invention. For instance, in lieu of the sodium salt of bromo-ethane-sulphonic acid in Example 1, the sodium or potassium salt of chloro- or iodo-ethane-sulphonic acid may be used. In lieu of the alkali salt of the sulphonic acid, an equivalent amount of the free acid and aqueous alkali may be used. Water, however, should be avoided in the process of Example 4 or 5 until after completion of the reaction, as otherwise the abietoyl or hydro-abietoyl chloride tends to decompose.

The temperature of the reaction in either process may vary within wide limits, 110 to 165° C. not being extreme. Pressure is not essential for the reaction except, of course, insofar as it keeps the solvent from evaporating.

It is not essential that our novel compounds be isolated in pure form in order to avail oneself of their high wetting properties. On the contrary, for use as a wetting agent, they may be mixed with various other assistants or reagents which may be desirable for the particular treatment of materials in which they are intended to be used. And those preparations may be manufactured and handled in solid form as a cake or powder, or as a solution in water, alcohol, or other suitable solvent.

For the same reason, it will be apparent that we need not start with pure abietic or hydro-abietic acid for the purpose of manufacturing our novel compounds. Rosin of any grade, either gum or wood, may be used. Hydrogenated rosin or hydrogenated abietic acid gives a particularly high grade and colorless product. Either rosin or abietic acid as such may be used, or a salt or soap thereof, such as the sodium or potassium salt. In either case the procedure is essentially the same as above, except that the quantities of initial material may be varied somewhat to correspond to the material used. Thus if hydrogenated rosin is used, it will suffice, in view of its higher acid number, to start with 96–98 parts of it in lieu of the 100 parts of gum rosin indicated in Example 1. So also, where a rosin soap is used, the quantity of alkali added to the reaction mass may be considerably cut down, as will be readily understood to those skilled in the art. As alkaline medium for the reaction, caustic soda, caustic potash, or other strong alkalis may be used.

Many other variations and modifications are possible in the procedure set forth without departing from the spirit of this invention.

We claim:

1. An ester of the following general formula:

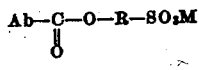

wherein $Ab$ stands for the radical $C_{19}H_{29}$ of abietic acid or $C_{19}H_{31}$ or $C_{19}H_{33}$ of hydrogenated abietic acid, R stands for the hydrocarbon residue of a short-chain alcohol-sulphonic acid, while M stands for hydrogen or a metallic atom or radical.

2. A sulpho-alkyl ester of an abietic acid.

3. A sulpho-alkyl ester of an abietic acid of the following general formula:

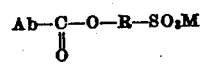

wherein $Ab$ stands for the radical $C_{19}H_{29}$ of abietic acid or $C_{19}H_{31}$ or $C_{19}H_{33}$ of hydrogenated abietic acid, R stands for the hydrocarbon residue of a short-chain alcohol-sulphonic acid, while M stands for hydrogen or a metallic atom or radical.

4. The sulpho-ethyl ester of an abietic acid.
5. The sulpho-propyl ester of an abietic acid.
6. Beta-sulpho-ethyl-abietate.
7. Beta-sulpho-ethyl-hydroabietate.
8. Sulpho-propyl-hydroabietate.

9. The process of producing an ester which comprises reacting an abietic acid compound containing an exchangeable substituent on the carbonyl group with an aliphatic-sulphonic acid compound containing a supplementary exchangeable substituent on one of the carbon atoms.

10. The process of producing an ester which comprises reacting material containing a compound of the group consisting of an abietic acid or a salt thereof with a halogen alkyl sulphonic acid compound in an alkaline medium.

11. The process of producing an ester which comprises reacting an abietoyl halide with an alkali metal salt of an alcohol-sulphonic acid.

12. The process of producing an ester which comprises reacting a hydroabietoyl halide with an alkali metal salt of an alcohol-sulphonic acid.

13. The process of producing an ester which comprises reacting hydroabietoyl chloride with an alkali metal salt of an alcohol-sulphonic acid selected from the group consisting of sulphoethyl alcohol and sulpho-propyl alcohol.

14. The process which comprises heating substantially 15 parts of sodium ethanol sulphonate with 32 parts of hydro-abietoyl chloride at a temperature of about 125° C. for a period of about 8 hours, diluting the reaction mass with water, and recovering the sulpho-ethyl ester of hydroabietic acid from the solution.

15. The process of producing an ester which comprises reacting material containing an abietic acid compound with a halogen alkyl sulphonic acid compound in an alkaline medium.

HENRY J. WEILAND.
CLYDE O. HENKE.
MILTON A. PRAHL.